June 17, 1930. C. E. MAYNARD 1,763,801
DEVICE FOR LAMINATING RUBBERIZED MATERIAL
Filed Dec. 1, 1927 3 Sheets-Sheet 1
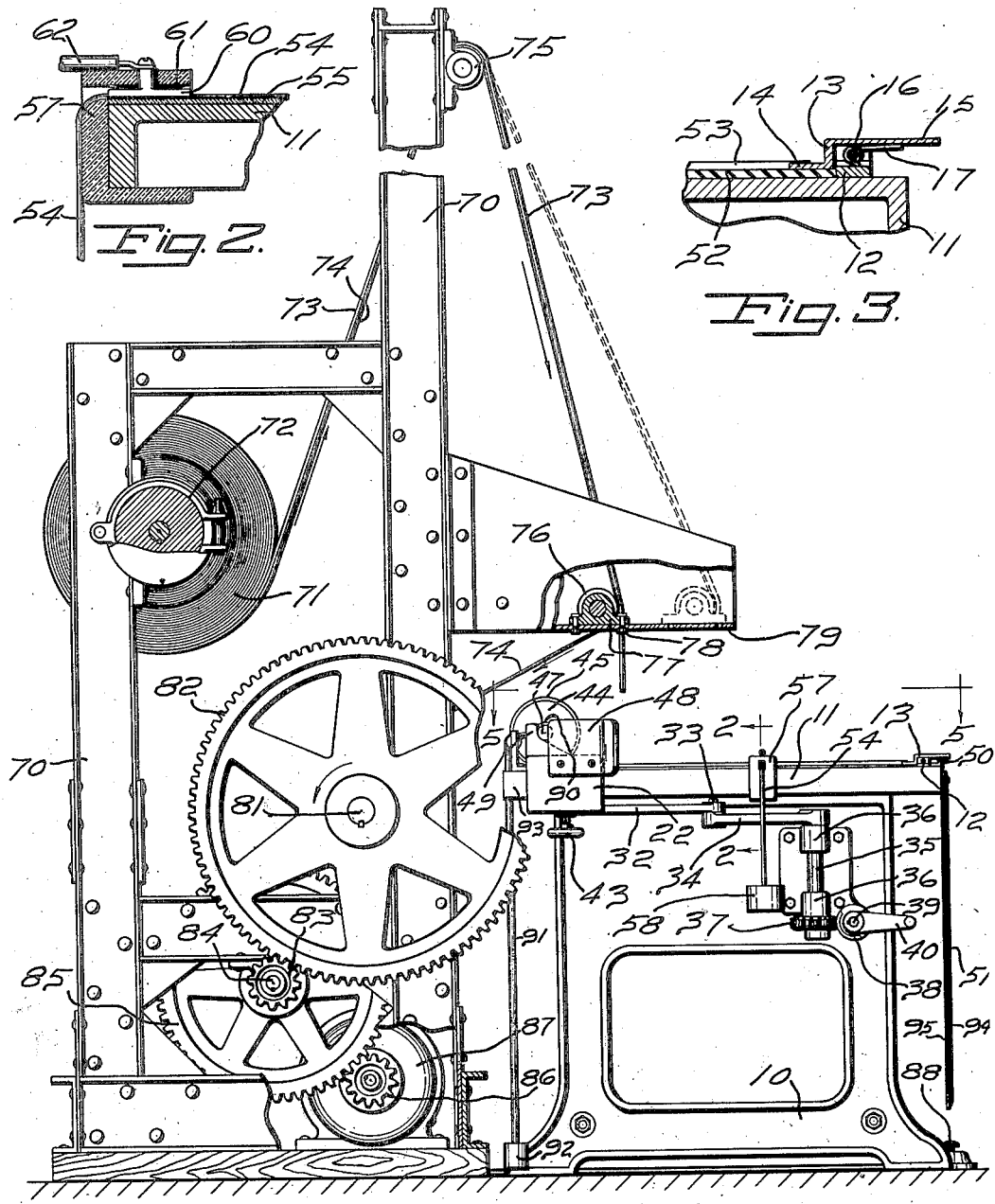
INVENTOR.
Charles Edgar Maynard
BY
Edward C. Taylor
ATTORNEY June 17, 1930. C. E. MAYNARD 1,763,801
DEVICE FOR LAMINATING RUBBERIZED MATERIAL
Filed Dec. 1, 1927 3 Sheets-Sheet 3
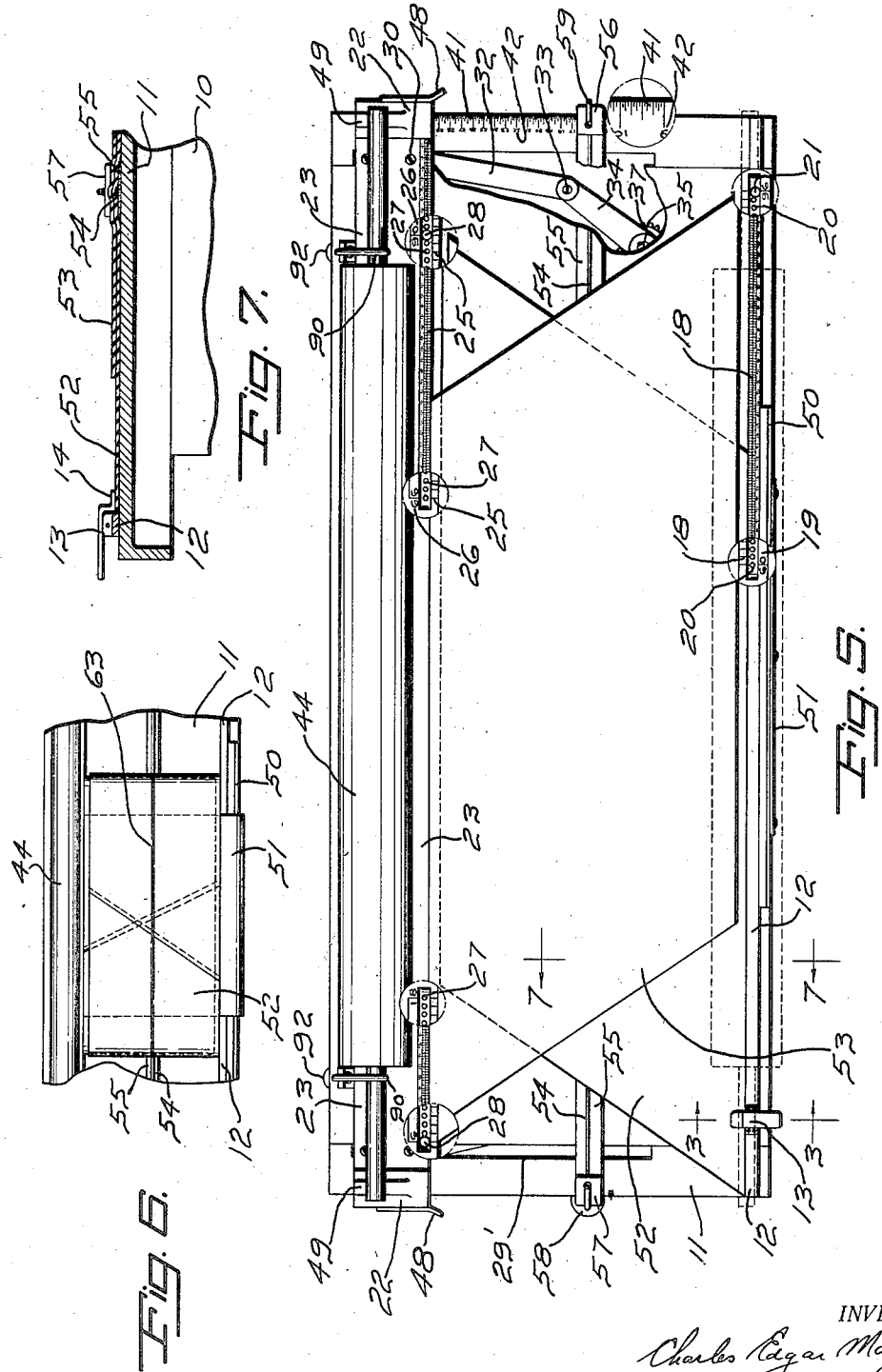
INVENTOR.
Charles Edgar Maynard
BY
Edward C. Taylor
ATTORNEY.

Patented June 17, 1930

1,763,801

UNITED STATES PATENT OFFICE

CHARLES EDGAR MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS

DEVICE FOR LAMINATING RUBBERIZED MATERIAL

Application filed December 1, 1927. Serial No. 236,912.

In the building of tire casings and in other rubber manufacturing operations it is sometimes desirable to laminate layers of bias cut material, usually with the strain-resisting members extending in opposite direction in adjacent plies. My invention relates to an improved apparatus by which bias cut material may be supplied to the operator, laminated and marked with an indication by which the laminated strip may be centered in later operations. The object of the invention is to provide such an apparatus possessing increased speed and accuracy and offering easier operating conditions and greater readiness of adjustment. A further object is to provide an apparatus by which either flat strips or endless bands may be formed. A further object is to improve the quality of the product by rolling the several plies tightly together. A further object is to mark the laminated strip or band with a line indicating the center of the strip. Other and further objects will appear from the description and claims.

Referring to the drawings,

Fig. 1 is an end elevation of the device constructed in accordance with my invention;

Fig. 2 is a section on line 2—2 of Fig. 1;

Fig. 3 is a section on line 3—3 of Fig. 5;

Fig. 5 is a top plan view of the table, omitting the fabric supply;

Fig. 6 is a top plan corresponding to a portion of Fig. 5 but on a much smaller scale and showing the manner of forming an endless band; and Fig. 7 is a section on line 7—7 of Fig. 5.

Figure 4:
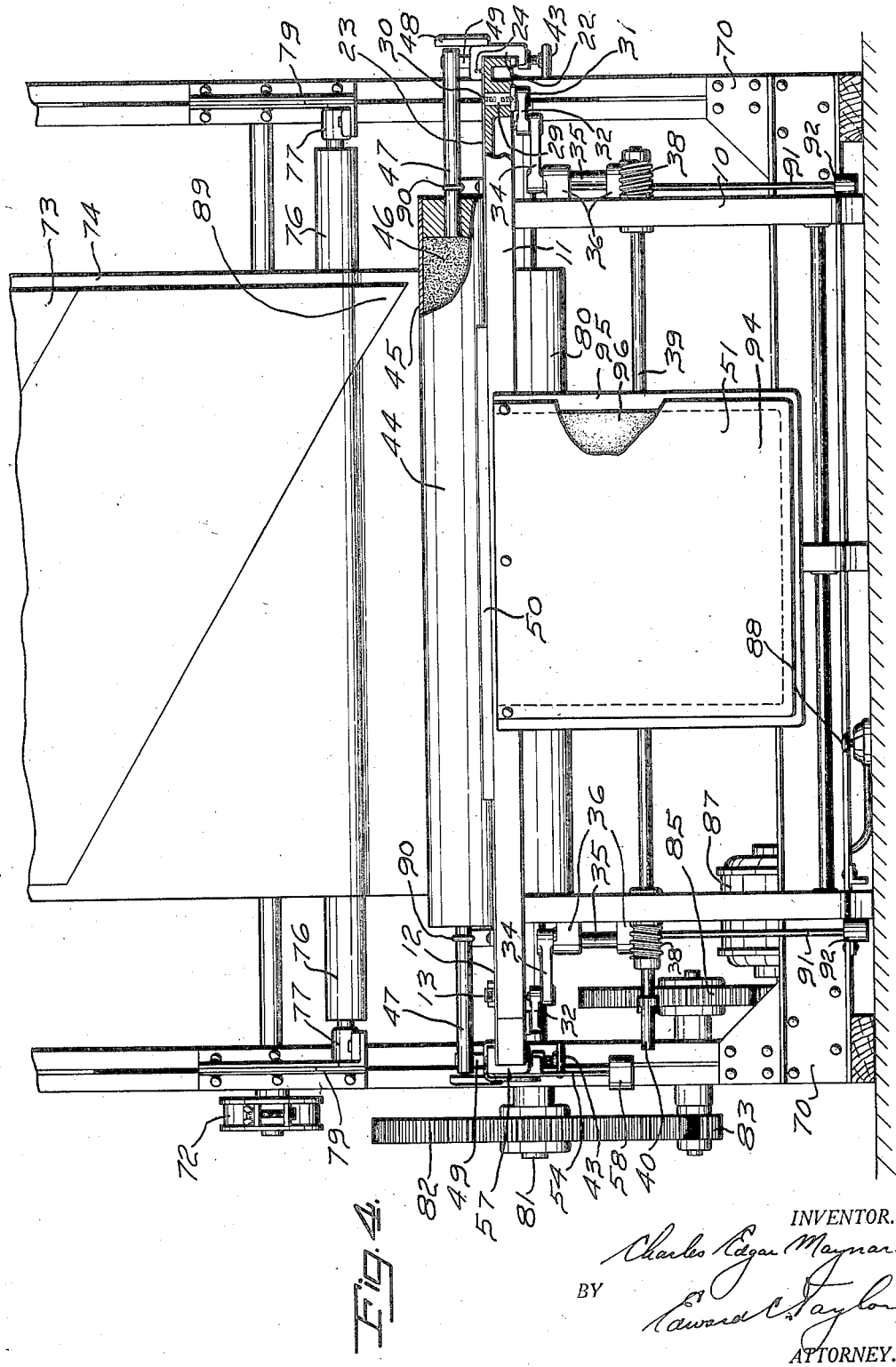
Fig. 4 is a front elevation of the device.

The invention will be described in connection with the making of endless bands designed for incorporation into the carcass portions of tire casings. This material is generally formed of rubberized cord fabric and is cut into strips on the bias, being presented to the machine of the present invention in this form. The laminating table of my invention is formed by a frame 10 having a flat top 11. Along the front side of this top is fixed a guide 12 at one end of which is mounted a small lever 13 shown best in Fig. 3. This lever is formed with a flat portion 14 adapted to hold a layer of fabric down to the table top, and with a handle portion 15. The lever is secured to guide 12 by a pin 16 and is constantly forced toward the table by a spring 17.

The guide 12 is provided with graduations 18 and numerals 19. Since the scale of Fig. 5 is too small to indicate the graduations a portion of the guide has been shown in dot and dash circles as if viewed through a magnifying glass. In these magnified portions of the guide are also shown holes 20 which extend in closely spaced relation along a considerable distance and into which may be placed pins 21. The pins serve as a convenient indication to the operator of the length of material which is to be laminated and of the position of one ply in respect to the ply which is to be laid upon it.

Mounted so as to embrace the ends of the table are slides 22 joined to a longitudinal plate 23 by screws 24. This plate serves as an adjustable guide opposed to the fixed guide 12 and bears graduations 25 and numerals 26 in a similar manner. Holes 27 in the plate receive pins 28 which indicate to the operator the position of the corners of the material as clearly shown in Fig. 5.

Blocks 29 sliding in transverse slots 29' in the table 11 are attached to the plate 23 by screws 30. Each block is provided with a pivot 31 joining it to a link 32 which in turn is joined by a pivot 33 to a crank 34 carried by a shaft 35. Each shaft 35 is mounted in bearings 36 on the frame and carries a worm wheel 37 meshing with a worm 38 on a common longitudinal shaft 39 suitably journaled in the frame and provided with a handle 40. By rotating the handle the back guide plate 23 may be moved transversely of the table parallel to the front guide 12.

Graduations 41 at one end of the table provided with numerals 42 indicate to the operator the position of the adjustable guide. After the desired adjustment is secured the guide is held in position by clamp screws 43.

A heavy roll 44, the surface 45 of which may be padded if desired, rolls freely upon the top of the table. The interior of this roll may be filled with sand or other material 46 to increase the weight and it is provided with a shaft 47 extending from each end. Upon the ends of the table are mounted guide plates 48 which when the roll is returned to the position shown in Fig. 5 strike the shaft if the roll is out of position and centralize it. Stops 49 upon the slides 22 limit the rearward motion of the roll and a ledge 50 at the front of the machine serves as a forward limit. To prevent accidents, a further limit to the forward movement of the roll may be insured by rings 90 passing around the shaft 47 and coupled by a cord or cable 91 to a weight 92. The cord passes through a hole in a portion 93 in the frame, so that only a limited forward motion is permitted to the roll. An apron 51 is mounted so as to hang freely from the front of the machine and is brought into play in the manufacture of endless bands as will be described below.

I will now describe the making of a laminated strip upon my improved table. Taking a strip 52 of bias cut material the operator places it upon a table with its edge in contact with the front guide 12. If the strip is not of the correct length the operator tears it off or sticks an additional piece onto it until it is of the correct length as indicated by the graduations on the guide. One corner of the strip is preferably located at the left end edge of the table and is loosely held by the clamp lever 13 as shown in Fig. 5. The second strip 53 is then placed on top of the first, its initial position being shown by one of the pins 28 on the rear guide and the rear edge of the strip being laid against the guide 23. This strip also is shortened or lengthened until it comes opposite the pin 21 shown at the right in Fig. 5 and is smoothed out over the top of the lower strip 52. The operator then manually rolls the heavy roller 44 off from its position on plate 23 so that it travels across the top of the two strips of fabric. The pressure exerted by the roll being along only one line at a time exerts a very considerable force upon each unit of area of the laminated material and causes very tight adherence between the rubberized layers.

If it is desired to make an endless band the same procedure as outlined above is followed and then the apron 51 is brought up and laid over the laminated strip as indicated in Fig. 6. The ends of the laminated strip are brought over the apron and are attached together as also shown in that figure. This can be done easily if the fishtail arrangement shown is adopted. When the splice has been made the roller 44 is again caused to pass over the strip firmly uniting the spliced edges. Due to the thickness of the apron 51 (preferably in the neighborhood of one-tenth inch) no creasing of the folded portions of the band will result. The apron is preferably made of a plurality of stepped-off fabric plies 94 and 95, separated by a layer of rubber 96, whereby thickness is obtained without abruptly shouldered edges.

Particularly in the manufacture of endless bands which are to be positioned upon tire cores it is desirable to mark a center line upon the laminated material. According to my invention I do this by means of a wire 54 stretched from one end to the other of the table and heated, for example, to a temperature of substantially 160° F., by means of the passage of an electric current through it. Underlying this wire and keeping it out of contact with the table top 11 is an insulating strip 55 which may be of fabric shellaced to the metal top of the table. At one end the wire is secured to a block 56 and at the other passes over the curved edge of a block of insulated material 57 shown in Fig. 2. A weight 58 attached to this free end of the wire maintains it taut and takes care of expansion of the wire when it is heated. Current is supplied to the wire through a connection 59 at one end secured to the block 56 which is preferably grounded to the machine and through a contact 60 mounted in the insulated block 57 at the other, a wire 62 leading from this connection to a suitable source of current. The temperature of the wire is low enough so that it does not burn the rubber or fabric and high enough so that it softens or even melts the rubber and produces a distinct line shown at 63 in Fig. 6, due both to the length of time the fabric is left on the wire and to the pressure of the roller 44.

The bias cut material is preferably supplied to the operator by a suitable arrangement of rolls carried upon a frame 70. The material is furnished to the machine in a roll 71 mounted so as to be acted upon by a brake 72. The fabric 73, previously severed along bias lines, is fed from the roll 71 upon its supporting and separating liner 74 over a guide roll 75 to a guide roll 76 positioned just above the table 11. In order to accommodate different widths of laminated material the roll 76 is preferably adjustable transversely of the table so that the fabric may always be taken off as near the operator as possible. Bearings 77 are provided at each end of the roll 76 and these are secured by bolts 78 to bracket 79 projecting over the table from the frame 70. In Fig. 1 two positions of the roll 76 are shown, one in full lines and the other in dotted lines.

From the roll 76 the liner passes to a wind-up roll 80 mounted by a shaft 81 suitably journaled in frame 70. A gear 82 upon this shaft meshes with a pinion 83 upon a short shaft 84 carrying in turn a gear 85 meshing with the pinion 86 of a motor 87. A control button 88 which starts and stops the motor through any standard control wiring is conveniently placed on the frame near the front of the laminating table so that the operator may start and stop the feed of the material by a slight touch of the foot alone.

The form of fabric supply which I have provided is especially suitable since the leading edge 89 of the bias cut material tends to hang down beyond the roll 76 and not to follow the liner due to the sharp bend which the latter makes around the roll. Taking the material in the position shown in Fig. 4, for example, the operator would grasp the leading corner of the bias cut strip, at the same time depressing the starting button 88. As the feed of the fabric continues the bias strip can be pulled off from the liner and the delivery of the material immediately stopped by removing the foot from the starting button.

Having thus described my invention, I claim:

1. A device for laminating layers of bias-cut rubberized fabric comprising a flat-top table, a fixed fabric edge guide thereon, an adjustable fabric edge guide of shallow depth mounted upon the top of the table, and a heavy roll movable across the table top and said adjustable guide.

2. A device for laminating layers of bias-cut rubberized fabric comprising a flat-top table, fabric edge guides thereon, a heavy roll movable manually across the top of the table, stops to prevent overtravel of the roll, and guides contacting with the roll to preserve it in alignment.

3. A device for laminating layers of bias-cut rubberized fabric comprising a flat-top table, fabric edge guides thereon, a heavy roll movable manually across the top of the table, and stops to prevent overtravel of the roll.

4. A device for laminating layers of bias-cut rubberized fabric comprising a flat-top table, fabric edge guides thereon, a heavy roll movable across the table top, and an imprinting device coacting with said roll to mark a center line upon the fabric.

5. A device for laminating layers of bias-cut rubberized fabric comprising a flat-top table, fabric edge guides thereon, a heavy roll movable across the table top, and a heated wire stretched along the table intermediate the guides to mark a center line upon the fabric.

6. A device for laminating layers of bias-cut material comprising a laminating table, a vertical liner support over the table, and means controllable by the operator for intermittently advancing a liner carrying bias-cut material downwardly towards the table.

7. A device for laminating layers of bias-cut material comprising a flat-top table, fabric edge guides thereon, means for adjusting one edge guide towards and from the other, means for supporting a material carrying liner in substantially vertical position over the table, and means for adjusting the position of the liner to correspond with different adjusted positions of the movable edge guide.

CHARLES EDGAR MAYNARD.